Patented Dec. 7, 1943

2,335,868

UNITED STATES PATENT OFFICE 2,335,868

SOLUTION AND PROCESS OF TREATING METAL

Herman J. Lodeesen, Royal Oak, Mich., assignor to Parker Rust Proof Company, Detroit, Mich.

No Drawing. Application February 21, 1941, Serial No. 379,999

13 Claims. (Cl. 148—6.5)

This invention relates to the art of coating ferrous surfaces and is more particularly concerned with the art of providing metal with corrosion-resistant paint-holding phosphate coatings.

A great number of solutions have been employed in the rust-proofing industry to provide coatings of the phosphate type. At present, the favored method is to provide a conveyor line for passing the articles to be coated through the coating apparatus, proper solutions being impinged upon the articles. For this purpose, phosphate coating solutions have been accelerated by the employment of oxidizing agents such as nitrates and nitrites.

Experimental tests have indicated that oxidizing agents as strong as permanganates work undesirably under ordinary conditions. I have discovered however that, if conditions are carefully regulated, it is possible to employ a permanganate, such as potassium permanganate, as an oxidizing agent in this process and obtain commercially satisfactory results.

By my invention it is possible to produce a coating with great rapidity. From a practical point of view, modern production methods generally require that the coating treatment be completed in substantially one minute when spray methods are employed, and usually not over five to ten minutes are allowed when immersion methods are used. The present invention makes possible a satisfactorily rapid operation, and at the same time provides a process which can be operated continuously over long periods without chemical or mechanical difficulties.

In the use of permanganate as an accelerator in a phosphate coating solution, it is very helpful to have the solution less acid, as indicated by pH measurements, than it would be were it allowed to completely hydrolyze. If the solution forming the initial bath has too low a pH, it may be brought to a suitable coating condition by the addition of a chemical capable of raising the pH. Any chemical which is compatible with the solution and capable of neutralizing phosphoric acid in the bath may be used for this purpose. As examples of compounds which may be employed, sodium hydroxide, zinc carbonate and sodium carbonate have proven satisfactory.

The state of hydrolysis which is desirable for the purposes of my invention will be further elaborated upon, but it will be pointed out here that an ordinary solution of pure zinc dihydrogen phosphate undergoes spontaneous hydrolysis, and this will continue until the solution is completely hydrolyzed, and reaches a state of equilibrium for any given temperature. At equilibrium the solution contains more phosphoric acid than is theoretically necessary to form zinc dihydrogen phosphate with the zinc in the solution. When the pH of the solution is above equilibrium, as when it is raised by a neutralizing agent, hydrolysis occurs with the deposition of zinc phosphate; and the amount the pH is above equilibrium is a convenient indication of this tendency to deposit zinc phosphate.

When a solution is hereinafter referred to as having a pH above equilibrium, it will be understood that the solution in question, were it allowed to reach equilibrium at the same temperature, would undergo some hydrolysis and develop a lower pH.

The pH at which the solution will coat most satisfactorily varies inversely with the temperature and the amount of zinc. But the pH of the solution at equilibrium varies in substantially the same way, decreasing with an increase in temperature or an increase in zinc phosphate in the solution and vice versa. Accordingly, while the actual pH necessary to produce commercially satisfactory coating action will vary with the temperature, the zinc content and other ingredients of the zinc phosphate bath, the amount which the pH should be above equilibrium for the particular solution being used remains much more nearly constant.

I have found that the coating effect of a zinc acid phosphate solution containing permanganate is improved by quite small additions of a neutralizing agent, but an appreciable amount is required where a commercially satisfactory coating is to be produced in a processing period limited to approximately one minute.

In general it has been found that the pH should be maintained at least .12 above that at which the coating solution would arrive, if it completely hydrolyzed, in order to consistently produce commercially passable coatings. A further increase in pH of .02 to .05 materially improves the results. A rule of thumb approximation, to avoid the deleterious effects of too low a pH on one hand and the deleterious effects of too high a pH on the other hand, is to employ a solution neutralized so as to have a pH of approximately .25 higher than would result from complete hydrolysis of that solution, and the neutralization should usually be kept within .13 pH, plus or minus of that figure, it being understood that a considerably higher pH may in some instances produce a satisfactory coating but that the increased sludge renders it both more difficult and less economical to employ solutions with an unnecessarily high pH. Also, as the pH rises, there is a tendency for the coating to become soft and non-adherent. Permanganate tends to make the coating harder and more adherent, and produces a good commercial coating with some neutralization, but cannot overcome the undesirable effect of excessive neutralization. On the other hand, if the pH is too low, little or no coating is obtained in one minute.

The above pH values were ascertained by coating steel automotive sheet metal that had been cleaned with a dilute kerosene emulsion containing sufficient ortho-silicate to produce a pH of approximately 8. The parts were thoroughly rinsed with water and the coating solution was sprayed on the metal, recirculated and resprayed for a period of one minute. The variation in the pH and consequent type of coating produced was brought about either by additions of caustic soda until a point was reached where suitable coatings were produced, or by allowing hydrolysis to progress to a point where undesirable coatings were obtained as a result of a drop in the pH of the processing solution.

The concentration of permanganate must be kept very small as compared with the amount of nitrate in a similar phosphate coating solution. Nitrate is often used in amounts in excess of 1%. If the permanganate concentration is too great, the coatings appear to contain considerable amounts of oxide, rather than being typically phosphate, and in many cases a smudge which is difficult to remove is formed. Therefore, permanganate concentrations (calculated as $MnO_4$) of not over .005% should be used in a solution containing not over .3% zinc. However, at this maximum concentration of permanganate, the coatings are not entirely satisfactory for best production. The preferred concentration is approximately .001% when the zinc constitutes .2% to .3% of the solution, which range of zinc is a good commercial concentration. Amounts less than this, such as .0005%, may be employed and good coatings produced under favorable conditions, but, as the minimum is approached, it becomes more difficult to maintain sufficient to render the process continuously satisfactory. Therefore, while good coatings may be produced under favorable conditions with as wide a variation in permanganate as from .005% to .0005%, it is preferred to maintain the $MnO_4$ as near .001% as can be done conveniently under working conditions.

During the coating reaction, it seems probable that the permanganate is reduced to a less highly oxidized manganic ion which still retains some oxidizing power. At any rate, after the purple color typical of permanganate has left, there remains for a time a reddish color, and during this time the accelerating effect continues. Therefore, while for convenience acceleration by permanganate is mentioned, it will be understood to include the acceleration resulting from the action of all manganic ions during their reduction from the $MnO_4$ form.

It should be noted further that the maximum permissible amount of permanganate increases when the immersion process is employed and there is relatively little movement of the solution in contact with the work. Also, an increase in the amount of zinc phosphate in the bath may be accompanied by some increase in the amount of permanganate.

The above described results of too much permanganate may assist in detecting the difficulty when too much permanganate has been added by accident; but ordinarily such conditions will not be even closely approached, since considerations of economy ordinarily will prevent increase of the permanganate above the point where such increase shows improved results, and the variation in permanganate above that point which results in no material change in the resulting coating is wide enough so that the operator can easily keep the solution within that range, when the approximate limits of this range are known.

Too little zinc in the solution results in little coating action, so that for the commercially desirable coating action within one minute, at least .1% of zinc in the solution is desirable and .2–.3% has been used commercially with very satisfactory results both as to economy of operation and quality of coating obtained. While larger amounts of zinc increase the coating effect and allow somewhat larger amounts of permanganate to be used without exceeding the beneficial amount, the greater zinc content results in greater deposit of sludge and is more wasteful of chemicals. For producing satisfactory coatings economically by the spray method described, it is recommended to keep the zinc content between .1% and .5%.

As previously stated the pH of the solutions decreases with a rise in temperature. As the temperature increases therefore it becomes necessary to add increased amounts of the neutralizing agent to maintain a given pH. Such a practice is less efficient as to consumption of both heat and chemicals and renders the solutions more difficult to control. Furthermore, high temperatures are not necessary with solutions according to my invention. Although phosphate solutions containing permanganate produce satisfactory coatings even at a temperature approaching 212° F., temperatures as low as 100° F. have been used in some instances with satisfactory results and very satisfactory commercial operation has been carried out at 125° F. to 135° F.

It is both convenient and advantageous to replenish continuously by running small quantities of the necessary materials into the coating solution. When they are added in the correct proportions, the solution will be maintained at the best operating conditions without the necessity of frequent testing, and more consistent results may be expected. The replenishing materials may be added separately, or various combinations may be used to reduce the number of solutions required. However, the combination of the neutralizing agent with the acid phosphate should be avoided.

A convenient method of replenishing is to provide a relatively concentrated solution of acid zinc phosphate containing permanganate. It has been found that considerable variations in the amount of permanganate in proportion to the zinc may be employed and still maintain the proportion in the working solution within the range for successful commercial operation.

As an example of a suitable replenishing solution, there may be employed zinc dihydrogen phosphate $Zn(H_2PO_4)_2 \cdot 2H_2O$ dissolved in water with sufficient additional phosphoric acid to keep it in solution, which in practice has been found to be about one pound of 75% phosphoric acid to from 6.7 pounds to 7 pounds zinc phosphate. A suitable permanganate may be employed with such a solution successfully in proportions so that the zinc in the solution is from 3.5 to 15 times by weight as much as the MnO₄. With the preferred solution, employed at about 150° F. and containing .2% to .3% zinc, a preferred proportion in the replenishing material is from 3.5 to 7 pounds of zinc to one of MnO₄.

Although the cleaning method employed in obtaining the figures given above involved the use of kerosene emulsion, ordinary alkali cleaners common to the trade may also be used with success. Dilute solutions containing ⅛–¼ ounce of the cleaner per gallon of water are the usual thing. It may be found that a slightly higher pH will be required, other conditions being equal, than where an emulsion cleaner is used.

The phosphates which have been most widely used for coating purposes are the dihydrogen phosphates of iron, zinc, and manganese. Of these, the above disclosure applies only to the zinc phosphate. Ferrous dihydrogen phosphate is oxidized by permanganate to ferric phosphate, which is precipitated as sludge, and manganese phosphate is likewise oxidized by permanganate with the precipitation of manganese dioxide. Cadmium phosphate could be used with permanganate if it were not too expensive, and phosphates of the alkaline earth metals are not oxidized by permanganate, but they are more difficult to control so as to produce satisfactory coatings than is zinc phosphate, and consequently the use of zinc phosphate is recommended, although the use of phosphates of cadmium and the alkaline earth metals with permanganate is possible. Where alkaline earth metal compounds are employed for neutralization, some alkaline earth phosphate results.

The quality of the coating produced is further improved if it is given a final rinse in a weak solution of chromic acid or a dichromate, preferably other than those of the alkali metals. A suitable concentration is from 3 to 14 ounces of the acid or salt per 100 gallons of rinsing solution, but larger and smaller amounts may be used with benefit. The chromium compound is dried onto the coating and remains as a permanent part of it.

While quite specific proportions and temperatures have been disclosed as preferable with emulsion cleaning and currently preferred spray application of the solution, it will be readily understood that quite wide variations may be made within the scope of the foregoing disclosure, especially with changing methods of pretreatment of the metal, changing methods of application of the solution, and different requirements as to the coatings produced.

What I claim is:

1. The method of coating ferrous metal surfaces which comprises applying to the surface a solution of a coating phosphate which is non-oxidizable by permanganate, said solution containing permanganate, the MnO₄ in the solution being from .0005% to .005%, and maintaining the pH of the solution above equilibrium.

2. The method of coating ferrous metal surfaces which comprises applying to the surface a solution of zinc dihydrogen phosphate containing permanganate, the MnO₄ in the solution being from .0005% to .005%, and maintaining the pH of the solution above equilibrium.

3. The method of coating ferrous metal surfaces which comprises applying to the surface a solution of zinc dihydrogen phosphate containing permanganate, the MnO₄ in the solution being from .0005% to .005%, and maintaining the pH of the solution above equilibrium by an amount from .12 to .38.

4. The method of coating ferrous metal surfaces, which comprises spraying thereon a solution of zinc dihydrogen phosphate and permanganate, the MnO₄ in the solution being from .0005% to .005%, and maintaining the pH of the solution from .12 to .38 above equilibrium.

5. The method of coating ferrous metal surfaces, which comprises spraying thereon a solution of zinc dihydrogen phosphate and permanganate, the zinc in the solution being .1% to .5% and the MnO₄ in the solution being from .0005% to .005%, and maintaining the pH of the solution from .12 to .38 above equilibrium.

6. The method of coating ferrous metal surfaces, which comprises spraying thereon a solution of zinc dihydrogen phosphate and permanganate, the zinc in the solution being .2% to .3% and the MnO₄ in the solution being from .0005% to .005%, and maintaining the pH of the solution from .12 to .38 above equilibrium.

7. A solution for coating metal, consisting of an aqueous solution of zinc dihydrogen phosphate and .0005% to .005% permanganate calculated as MnO₄, and having a pH value greater than the solution has at equilibrium.

8. A solution for coating metal, consisting of an aqueous solution of zinc dihydrogen phosphate and .0005% to .005% permanganate calculated as MnO₄, and having a pH value of .12 to .38 greater than equilibrium.

9. A solution for coating metal, consisting of an aqueous solution of zinc dihydrogen phosphate containing from .1% to .5% zinc and .0005% to .005% permanganate calculated as MnO₄, and having a pH value of .12 to .38 greater than equilibrium.

10. A solution for coating metal, consisting of an aqueous solution of zinc dihydrogen phosphate containing from .2% to .3% zinc and .0005% to .005% permanganate calculated as MnO₄, and having a pH value of .12 to .38 greater than equilibrium.

11. A material for replenishing a solution for coating ferrous metals, said material containing an acid zinc phosphate and permanganate in proportions such that the zinc in the material is from 3.5 to 15 times as much as the MnO₄, by weight.

12. A material for replenishing a solution for coating ferrous metals, said material containing an acid zinc phosphate and permanganate in proportions such that the zinc in the material is from 3.5 to 7 times as much as the MnO₄, by weight.

13. A concentrated solution for replenishing a dilute solution for coating ferrous surfaces, said replenishing solution containing zinc, phosphoric acid and permanganate, the phosphoric acid being in an amount calculated to provide ¾ pound H₃PO₄ for 6.7 pounds to 7 pounds of $$Zn(H_2PO_4)_2 \cdot 2H_2O$$

and there being from 3.5 to 7 times as much Zn as MnO₄ in the solution, by weight.

HERMAN J. LODEESEN.